(12) United States Patent
Li et al.

(10) Patent No.: US 10,399,069 B2
(45) Date of Patent: Sep. 3, 2019

(54) HYDROISOMERIZATION AND CRACKING CATALYST FOR PREPARING BIOLOGICAL AVIATION KEROSENE FROM CASTOR OIL

(71) Applicants: Nankai University, Tianjin (CN); Tianjin Nankai University Castor Engineering Science and Technology Co., Ltd., Tianjin (CN); Tianjin Bineng Science and Technology Co., Ltd., Tianjin (CN)

(72) Inventors: Wei Li, Tianjin (CN); Baoxia Ni, Tianjin (CN); Qingxin Guan, Tianjin (CN); Liangnian He, Tianjin (CN); Feng Ye, Tianjin (CN); Xiaoying Cui, Tianjin (CN)

( * ) Notice: Subject to any disclaimer, the term of this patent is extended or adjusted under 35 U.S.C. 154(b) by 0 days.

(21) Appl. No.: 15/888,019

(22) Filed: Feb. 3, 2018

(65) Prior Publication Data

US 2018/0169639 A1  Jun. 21, 2018

Related U.S. Application Data

(63) Continuation of application No. PCT/CN2015/089535, filed on Sep. 14, 2015.

(30) Foreign Application Priority Data

Aug. 3, 2015 (CN) .......................... 2015 1 0465351

(51) Int. Cl.
| | |
|---|---|
| *B01J 29/06* | (2006.01) |
| *B01J 29/89* | (2006.01) |
| *B01J 29/064* | (2006.01) |
| *B01J 29/076* | (2006.01) |
| *B01J 29/40* | (2006.01) |
| *B01J 29/072* | (2006.01) |
| *B01J 29/48* | (2006.01) |
| *B01J 29/42* | (2006.01) |
| *B01J 29/46* | (2006.01) |
| *B01J 37/10* | (2006.01) |
| *B01J 37/00* | (2006.01) |
| *B01J 37/02* | (2006.01) |
| *B01J 23/85* | (2006.01) |
| *B01J 23/883* | (2006.01) |
| *B01J 23/888* | (2006.01) |
| *B01J 37/04* | (2006.01) |
| *B01J 37/06* | (2006.01) |
| *B01J 37/08* | (2006.01) |
| *C10G 65/00* | (2006.01) |
| *C10G 65/12* | (2006.01) |
| *C10G 3/00* | (2006.01) |

(52) U.S. Cl.
CPC .............. *B01J 29/89* (2013.01); *B01J 23/85* (2013.01); *B01J 23/883* (2013.01); *B01J 23/8885* (2013.01); *B01J 29/061* (2013.01); *B01J 29/064* (2013.01); *B01J 29/072* (2013.01); *B01J 29/076* (2013.01); *B01J 29/40* (2013.01); *B01J 29/42* (2013.01); *B01J 29/46* (2013.01); *B01J 29/48* (2013.01); *B01J 37/00* (2013.01); *B01J 37/0018* (2013.01); *B01J 37/0207* (2013.01); *B01J 37/0209* (2013.01); *B01J 37/0213* (2013.01); *B01J 37/04* (2013.01); *B01J 37/06* (2013.01); *B01J 37/08* (2013.01); *B01J 37/10* (2013.01); *C10G 3/49* (2013.01); *C10G 65/00* (2013.01); *C10G 65/12* (2013.01); *B01J 37/0203* (2013.01); *B01J 2229/16* (2013.01); *B01J 2229/18* (2013.01); *B01J 2229/186* (2013.01); *B01J 2229/34* (2013.01); *Y02P 30/20* (2015.11)

(58) Field of Classification Search
CPC ...... B01J 23/85; B01J 23/883; B01J 23/8885; B01J 29/89; B01J 29/061; B01J 29/064; B01J 29/072; B01J 29/076; B01J 29/40; B01J 29/42; B01J 29/46; B01J 29/48; B01J 2229/16; B01J 2229/18; B01J 2229/186; B01J 2229/34; B01J 37/04; B01J 37/06; B01J 37/08; B01J 37/10; B01J 37/0018; B01J 37/0203; B01J 37/0209; B01J 37/0207; B01J 37/0213
USPC ................................... 502/60, 73, 74, 85, 77
See application file for complete search history.

(56) References Cited

FOREIGN PATENT DOCUMENTS

| CN | 1778872 A | 5/2006 |
|---|---|---|
| CN | 103420851 A | 12/2013 |

OTHER PUBLICATIONS

International Search Report of PCT/CN2015/089535, dated May 10, 2016.

*Primary Examiner* — Elizabeth D Wood
(74) *Attorney, Agent, or Firm* — Erson IP (Nelson IP)

(57) ABSTRACT

The present invention relates to a hydroisomerization and cracking catalyst for preparing biological aviation kerosene from castor oil as well as a preparation method and an application thereof. The catalyst takes a Al-modified titanium silicate molecular sieve (TS-1) as a carrier, and takes $Ni_xW$ and $Ni_xMo$ as active components, wherein x is the atomic ratio of Ni to W or Ni to Mo, and x=5-10, wherein the mass of the active components accounts for 5-30% of the total mass of the catalyst; the molar ratio of Si:Ti in the Al-modified titanium silicate molecular sieve is 50-100, and the molar ratio of Si:Al is 50-100.

4 Claims, 3 Drawing Sheets

HYDROISOMERIZATION AND CRACKING CATALYST FOR PREPARING BIOLOGICAL AVIATION KEROSENE FROM CASTOR OIL

FIELD OF THE INVENTION

The present invention relates to a catalyst for preparing biological aviation kerosene from castor oil, and particularly to a hydroisomerization and cracking catalyst for preparing biological aviation kerosene from castor oil as well as a preparation method and an application thereof. The catalyst includes an Al-modified titanium silicate molecular sieve (TS-1) as a carrier, and $Ni_xW$ and $Ni_xMo$ (x=5-10) as active components, and uses urea as a dispersant when the active components are loaded High-yield biological aviation kerosene can be obtained using the present invention.

BACKGROUND OF THE INVENTION

Rapid development of the current industry causes huge energy consumption, and the overexploitation of petroleum makes an energy problem increasingly prominent. In order to ease the energy problem, development of renewable energy becomes a necessary means. In recent years, research on preparation of biodiesel and aviation kerosene from animal and vegetable oil through a hydrogenation method emerge continuously. Castor is an oil-production crop with easy growth and high oil yield, and meanwhile castor oil is not edible, so the castor oil can be used as a good raw material for preparing biological aviation kerosene and has broad application prospects.

A main component of aviation kerosene is a mixture of straight-chain and branched-chain alkanes with a carbon number of 8-16. The branched-chain alkanes are the main components of aviation kerosene due to the influence of freezing points. Standards of the aviation kerosene (from ASTMD7566) include: a freezing point smaller than $-47°$, a flashing point greater than 38° C. a viscosity smaller than 8.0 $mm^2S^{-1}$, a boiling point between 200-300° C. a sulfur content smaller than 20 ppm, an olefin content smaller than 2%, and a content of aromatic hydrocarbon smaller than 1%. It is known that the biological aviation kerosene made from Jatropha curcas has a freezing point of $-49°$ C. a flashing point of 44° C. viscosity of 4.3 $mm^2S^{-1}$, a boiling point between 200-300° C. and the content of sulfur, olefin and aromatic hydrocarbon of zero. The main component of the castor oil is glyceride of 9-alkenyl-12-hydroxyoctadecanoic acid. First, a hydroxyl group and double bonds are removed from the castor oil through hydrodeoxygenation to generate straight-chain alkanes with carbon numbers of 17 and 18. Then through isomerization and cracking reactions in the presence of a selected appropriate catalyst, the carbon chain is isomerized and cracked into straight-chain and branched-chain alkanes with a carbon number of 8-16. Therefore, in the hydroisomerization and cracking reactions, the selectivity to the product is of vital importance. Only by selecting an appropriate carrier and active component, the high-yield aviation kerosene component can be obtained.

Chinese patent CN101952392A discloses a method for preparing aviation fuel from renewable raw materials such as vegetable oil and animal fat. The raw materials are contacted with a hydrodeoxygenation catalyst to prepare straight-chain alkanes, then contacted with an isomerization catalyst to isomerize at least part of straight-chain alkanes to generate branched-chain alkanes and then contacted with a selective cracking catalyst to obtain C8-C16 alkanes, CN102482595A discloses a method for producing a base material of aviation fuel oil. By hydrogenating the animal fat and the vegetable oil as the raw materials through a catalyst with a hydrodeoxygenation function and hydroisomerizing the raw materials, the aviation fuel is obtained. CN102676203A discloses a method for preparing biomass aviation fuel by using the Jatropha oil, rubber seed oil, palm oil and swill-cooked dirty oil as raw materials through processes of double-bond oxidation, hydrolysis and decarboxylation reactions. CN102994138A discloses a method for preparing biological aviation kerosene by using the swill-cooked dirty oil as a raw material. CN201410080542.4 discloses a catalyst for preparing aviation kerosene from castor oil and a preparation method thereof. The preparation method mainly adopts 3-aminopropyltriethoxysilane and citric acid to modify the hydrodeoxygenation carrier, and simultaneously introduces Fe as an additive of the hydrodeoxygenation catalyst. CN201510038506.6 discloses a preparation method of hydrodeoxygenation and hydroisomerization catalysts for preparing biological aviation kerosene from castor oil, which mainly includes the modified MCM-41 as the carrier of the hydrodeoxygenation catalyst; and for the hydroisomerization catalyst, the modified SAPO-11 is selected as the carrier, and the selected active component is one of Pt, Pd or Ni.

Although reports of the above literature provide a possibility of preparing biological aviation kerosene by using biomass as raw material, there are still problems of complex production processes, low catalyst activity, poor product selectivity, high cost and low catalytic efficiency, and particularly a problem of difficulty in obtaining high-yield biological aviation kerosene.

SUMMARY OF THE INVENTION

In order to overcome the shortcomings and deficiencies of the prior art, the primary purpose of the present invention is to provide a hydroisomerization and cracking catalyst for preparing biological aviation kerosene from castor oil.

Another purpose of the present invention is to provide a preparation method of the above catalyst. In the preparation method, the Al-modified titanium silicate molecular sieve (TS-1) is regarded as a carrier; $Ni_xW$ and $Ni_xMo$ (x=5-10) are further loaded as active components; Ti and Al are simultaneously introduced during the preparation of the titanium silicate molecular sieve (TS-1); and the Al is removed partially after the synthesis is completed. The hydroisomerization and cracking catalyst for preparing biological aviation kerosene from castor oil is obtained by controlling the removal amount of Al, especially by synthesizing interstitial-type metal compounds $Ni_xW$ and $Ni_xMo$ as active centers and using urea as the dispersant when the active components are loaded.

Still another purpose of the present invention is to provide an application of the above catalyst in preparing biological aviation kerosene by using an anhydrous liquid product after hydrodeoxygenation of castor oil as raw oil of hydroisomerization and cracking reactions, thereby obtaining high-yield biological aviation kerosene.

The purposes of the present invention are achieved through the following solution:

The present invention provides a hydroisomerization and cracking catalyst for preparing biological aviation kerosene from castor oil. The catalyst includes a Al-modified titanium silicate molecular sieve (TS-1) as a carrier, and $Ni_xW$ and $Ni_xMo$ as active components, wherein x is an atomic ratio of Ni to W or Ni to Mo, and x=5-10, wherein the mass of the active components accounts for 5-30% of the total mass of the catalyst, and preferably 10-25%; a molar ratio of Si:Ti in the Al-modified titanium silicate molecular sieve is 50-100, and the molar ratio of Si:Al is 50-100.

The preparation method of the above catalyst provided by the present invention includes the following steps:

1) thoroughly stirring and mixing an aqueous solution of tetrapropylanmmonium hydroxide with a tetraethoxysilane solution at a temperature of 40-55° C. for 0.5-2 h, then adding an isopropanol solution of tetrabutyl titanate to obtain a mixed solution, and then adding aluminium iso-propoxide and continuously stirring for 1-3 h;

2) heating, stirring and refluxing the above mixed solution in a water bath with a constant temperature of 75-85° C. for 1-3 h to remove the isopropanol from the solution, and then complementing the mass of the solution obtained after refluxing to the value before heating, stirring and refluxing by using deionized water;

3) transferring the above solution into a high pressure reaction kettle to conduct aging at 95-105° C. for 4-6 h, then heating to 150-180° C. to conduct crystallization for 6-36 h, taking out and washing the sample with deionized water until neutral, calcining in a muffle furnace at 500-550° C. for 4-6 h after drying, cooling to room temperature and then placing into an HCl solution of 0.5 mol/L, and heating, stirring and refluxing at 50-60° C. or 1-5 h;

4) separating the above obtained sample through suction filtration, washing with deionized water until neutral, and after drying, calcining at 500-550° C. or 2-4 h under a nitrogen atmosphere to obtain an Al-modified TS-1 carrier;

5) sequentially adding nickel nitrate, ammonium meta-tungstate or ammonium molybdate into an aqueous solution of urea according to a ratio under room-temperature stirring conditions, stirring for 0.5-1 h until completely dissolved, then adding the Al-modified TS-1 obtained above and stirring for at least 2 h, and drying the mixture in a rotary evaporator at 80-90° and 6) calcining the obtained solid powder in an air atmosphere at 550-600° C. for at least 2 h, then reducing at 550-600° C. at a hydrogen flow rate of 200-300 mL/min for at least 3 h, cooling to room temperature, and then passivating with $O_2/N_2$ passivating gases at a volume ratio of 1% for 3 hours to obtain the desired catalyst.

In the above preparation method, Si is calculated as $SiO_2$, Ti is calculated as $TiO_2$, and the molar ratio of materials in steps 1) to 2) is $SiO_2$:$TiO_2$:TPAOH (tetrapropylammonium hydroxide):aluminium isopropoxide:isopropanol:$H_2O$=1: 0.01-0.02:0.1-0.4:0.01-0.02:0.1-0.5:20-100.

In step 5), the urea is used as the dispersant, and the added amount thereof is 2-5% f mass of the carrier, and preferably 2-3%.

The present invention provides the application of the above catalyst, and the specific application (use) method includes the following steps:

1) pretreatment of the catalyst: forming a catalyst of a required amount and then filling the catalyst in a fixed bed reactor, heating to 400-450° C. under nitrogen purging with volume space velocity of 800-1200 $h^{-1}$; changing into hydrogen with the same volume space velocity, maintaining the temperature of 400-450° C. for at least 3 hours; and then regulating the temperature of the reactor to a temperature of a hydroisomerization and cracking reaction; and 2) hydroisomerization and cracking reaction: adopting an anhydrous liquid product obtained after the hydrodeoxygenation of the castor oil as raw oil for the hydroisomerization and cracking reaction; regulating a pressure of a reaction system to 2-4 MPa, a reaction temperature to 270-350° a hydrogen-oil ratio to 700-1500, and volume space velocity of the fed raw oil to 1-3 $h^{-1}$; and collecting a liquid product obtained in the reaction every 2 hours.

The anhydrous liquid product obtained after the hydrodeoxygenation of the castor oil includes 95-97% of alkanes having the carbon number of 17 and 18, 1-3% of alkanes having the carbon number of 8-16, and 1-2% of alkanes having the carbon number of 5-7.

The preparation method of the anhydrous liquid product obtained after the hydrodeoxygenation of the castor oil includes: obtaining a hydrodeoxygenation product by using castor oil (the castor oil is available from Tianjin Guangfu Science and Technology Co., Ltd., wherein 90% of the component is ricinoleic acid and 10% of the component is palmitic acid and stearic acid) as the raw material and adopting an catalyst (the catalyst includes SAPO-II as the carrier and $Ni_2P$ as the active component, wherein the active component accounts for 25% of the total mass of the catalyst) (see the literature Liu, S.; Zhu, Q.; Guan, Q.; He, L.; Li, W. Bio-aviationfuelproductionfromhydroprocessing-castoroilpromotedbythenickel-basedbifunctionalcatalysts. Bioresour. Technol. 2015, 183, 93-100.), and removing water from the hydrodeoxygenation product by separating the water using a separating funnel, thereby obtaining the anhydrous liquid product obtained after the hydrodeoxygenation of the castor oil.

The present invention has the features that in the preparation process of the catalyst, firstly Ti and Al are simultaneously introduced during synthesis of the TS-1; and then the Al is removed partially after the synthesis is completed, by controlling the removal amount of Al, synthesizing interstitial-type metal compounds $Ni_xW$ and $Ni_xMo$ as active centers and using urea as the dispersant when the active components are loaded, the precursor of the active component can be dispersed on the surface of the carrier in an ultrahigh position; the urea is decomposed and removed during the subsequent high-temperature calcining process; and meanwhile, the particle size of the catalyst is blocked by the dispersant, so the catalyst is not sintered at high temperature and the particle size of the metal component in the catalyst is smaller and more uniform. Particularly, $Ni_xW$ and $Ni_xMo$ as active centers of the catalyst are not ordinary bimetallic catalysts, and in the preparation process W or Mo enters the lattice of Ni, so that Ni has an expanded lattice, a longer bond length, and weakened bond energy (see the literature Li, R.; Guan, Q.; Wei, R.; Yang, S.; Shu, Z.; Dong, Y.; Chen, J.; Li, W. A Potential Regularity for Enhancing the Hydrogenation Properties of $Ni_2$ P.J. Phys. Chem. C2015, 119, 2557-2565.). Thus, the catalyst has better hydrogen dissociation activity, and a high-yield biological aviation kerosene component can be obtained.

DETAILED DESCRIPTION OF THE EMBODIMENTS

Figure 1:
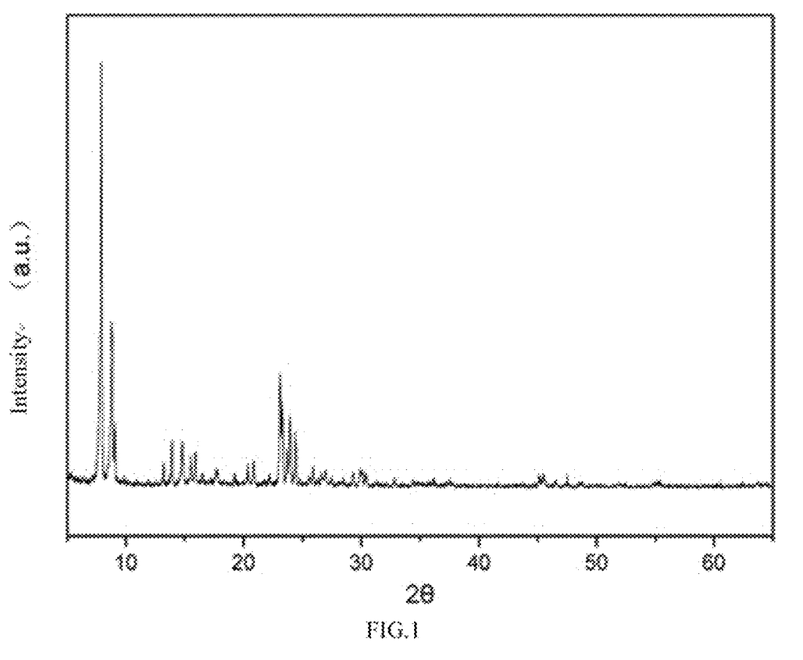
FIG. 1 is a powder X-ray diffraction pattern of Al-modified TS-1 synthesized in embodiment 1.
Figure 2:
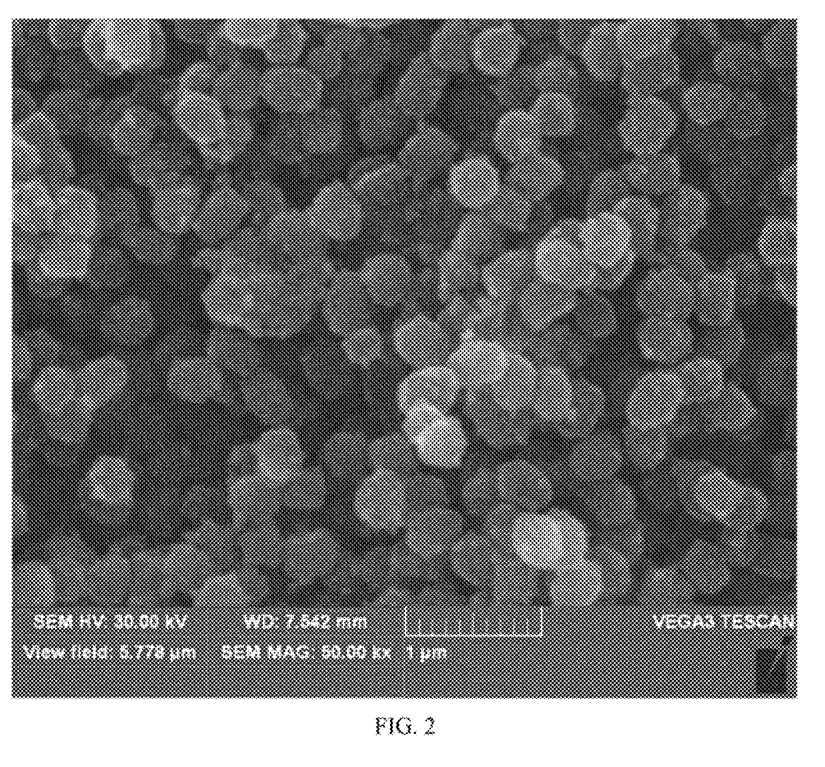
FIG. 2 is a scanning electron microscope diagram of a catalyst catl prepared in embodiment 1.
Figure 3:
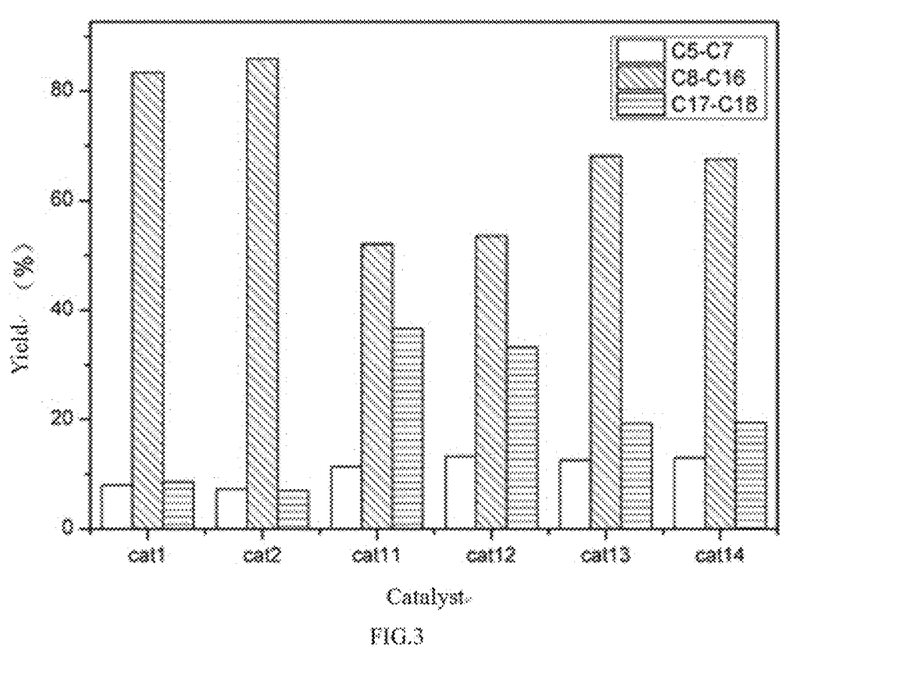
FIG. 3 is a histogram of experimental results obtained by operating catalysts catl-2 and catl1-14 prepared in embodiments 1-2 and reference examples 11-14 in accordance with a using method of embodiment 12.

Embodiments below are intended to enable those ordinary skilled in the art to understand the present invention in detail or to make nonessential improvements and adjustments according to contents of the present invention. However, the illustrated embodiments do not make any limitation to a scope of technical solutions required to be protected by claims of the present invention, and are included in, but not include all the scope required to be protected. Meanwhile, it is particularly indicated that experimental methods without marked specific conditions in embodiments are generally implemented according to routine conditions and conditions in a manual or according to conditions suggested by a manufacturer. The used general equipment, materials, reagents and the like may be obtained commercially, unless otherwise specified

Embodiment 1. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, and then adding 0.08 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 24 g of deionized water and stirring until dissolved to obtain a solution E; then adding 7.5 g of nickel nitrate and continuously stirring for 1 h then adding 0.73 g of ammonium metatungstate and stirring until completely dissolved; then adding 8 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat1.

Embodiment 2. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, and then adding 0.08 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 22.5 g of deionized water and stirring until dissolved to obtain a solution E; then adding 10 g of nickel nitrate and continuously stirring for 1 h; then adding 0.93 g of ammonium molybdate and stirring until completely dissolved then adding 7.5 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat2.

Embodiment 3. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° 9 and after stirring for 30 minutes, slowly adding 5.83 g of tetraethoxysilane and continuously stirring for 2 h to obtain a solution A; dropwise adding 0.19 g of tetrabutyl titanate into 0.4 g of isopropanol under stirring at 50° C. and then continuously stirring for 0.5 h to obtain a solution B; then slowly adding the solution B dropwise into the solution A under high-speed stirring, and then adding 0.11 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 27.6 g of deionized water and stirring until dissolved to obtain a solution E; then adding 3 g of nickel nitrate and continuously stirring for 1 h; then adding 0.29 g of ammonium metatungstate and stirring until completely dissolved, then adding 9.2 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat3.

Embodiment 4. Preparation of a
Hydrodeoxygenation and Cracking Catalyst
Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.19 g of tetrabutyl titanate into 0.4 g of isopropanol under stirring at 50° C. and then continuously stirring for 0.5 h to obtain a solution B; then slowly adding the solution B dropwise into the solution A under high-speed stirring, and then adding 0.11 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 21.9 g of deionized water and stirring until dissolved to obtain a solution E; then adding 8.5 g of nickel nitrate and continuously stirring for 1 h; then adding 1.48 g of ammonium metatungstate and stirring until completely dissolved; then adding 7.3 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat4.

Embodiment 5. Preparation of a
Hydrodeoxygenation and Cracking Catalyst
Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.19 g of tetrabutyl titanate into 0.4 g of isopropanol under stirring at 50° C. and then continuously stirring for 0.5 h to obtain a solution B; then slowly adding the solution B dropwise into the solution A under high-speed stirring, and then adding 0.11 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. or 2 h to obtain Al-modified TS-1, i.e., the carrier A; and (2) uploading active components: under conditions of stirring at room temperature, dissolving 0.2 g of urea into 22.5 g of deionized water and stirring until dissolved to obtain a solution E; then adding 10 g of nickel nitrate and continuously stirring for 1 h; then adding 0.93 g of ammonium molybdate and stirring until completely dissolved; then adding 7.5 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat5.

Embodiment 6. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.19 g of tetrabutyl titanate into 0.4 g of isopropanol under stirring at 50° C. and then continuously stirring for 0.5 h to obtain a solution B; then slowly adding the solution B dropwise into the solution A under high-speed stirring, and then adding 0.11 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. or 2 h to obtain Al-modified TS-1, i.e., the carrier A; and (2) uploading active components: under conditions of stirring at room temperature, dissolving 0.2 g of urea into 27 g of deionized water and stirring until dissolved to obtain a solution E; then adding 4.25 g of nickel nitrate and continuously stirring for 1 h; then adding 0.28 g of ammonium molybdate and stirring until completely dissolved; then adding 9 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed, and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat6.

Embodiment 7. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.1 g of tetrabutyl titanate into 0.2 g of isopropanol under stirring at 50° C. and then continuously stirring for 0.5 h to obtain a solution B; then slowly adding the solution B dropwise into the solution A under high-speed stirring, and then adding 0.06 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 27.6 g of deionized water and stirring until dissolved to obtain a solution E; then adding 3 g of nickel nitrate and continuously stirring for 1 h; then adding 0.29 g of ammonium metatungstate and stirring until completely dissolved; then adding 9.2 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat7.

Embodiment 8. Preparation of a Hydrodeoxygenation and Cracking Catalyst Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.1 g of tetrabutyl titanate into 0.2 g of isopropanol under stirring at 50° C. and then continuously stirring for 0.5 h to obtain a solution B; then slowly adding the solution B dropwise into the solution A under high-speed stirring, and then adding 0.06 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 21.9 g of deionized water and stirring until dissolved to obtain a solution E; then adding 8.5 g of nickel nitrate and continuously stirring for 1 h; then adding 1.48 g of ammonium metatungstate and stirring until completely dissolved; then adding 7.3 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat8.

Embodiment 9. Preparation of a
Hydrodeoxygenation and Cracking Catalyst
Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.1 g of tetrabutyl titanate into 0.2 g of isopropanol under stirring at 50° C. and then continuously stirring for 0.5 h to obtain a solution B; then slowly adding the solution B dropwise into the solution A under high-speed stirring, and then adding 0.06 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h, cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 0.2 g of urea into 22.5 g of deionized water and stirring until dissolved to obtain a solution E; then adding 10 g of nickel nitrate and continuously stirring for 1 h; then adding 0.93 g of ammonium molybdate and stirring until completely dissolved, then adding 7.5 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed, and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat9.

Embodiment 10. Preparation of a
Hydrodeoxygenation and Cracking Catalyst
Comprises the Following Steps (1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.1 g of tetrabutyl titanate into 0.2 g of isopropanol under stirring at 50° C. and then continuously stirring for 0.5 h to obtain a solution B; then slowly adding the solution B dropwise into the solution A under high-speed stirring, and then adding 0.06 g of aluminum isopropoxide into the solution A after the dropwise adding is completed, and continuously stirring for 3 h to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h, cooling the sample to room temperature and then placing into an HCl solution of 0.5 mol/L; heating, stirring and refluxing at 60° C. for 3 h, separating the sample through suction filtration and then washing the sample with deionized water until neutral; and drying and then calcining in a nitrogen atmosphere at 550° C. or 2 h to obtain Al-modified TS-1, i.e., the carrier A; and (2) uploading active components: under conditions of stirring at room temperature, dissolving 0.2 g of urea into 27 g of deionized water and stirring until dissolved to obtain a solution E; then adding 4.25 g of nickel nitrate and continuously stirring for 1 h; then adding 0.28 g of ammonium molybdate and stirring until completely dissolved; then adding 9 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by cat10.

Embodiment 11. A Using Method of a Hydrodeoxygenation and Cracking Catalyst Comprises the Following Steps (1) pretreatment of the catalyst: forming 6 g of the catalyst cat1 in embodiment 1 and then filling the catalyst in a fixed bed reactor; heating to 400° C. under nitrogen purging with volume space velocity of 1000 $h^{-1}$; changing into hydrogen with the same volume space velocity; maintaining a temperature of 400° C. for 3 hours, and regulating a temperature of the reactor to 280° C. and (2) hydroisomerization and cracking reaction: adopting an anhydrous liquid product obtained after the hydrodeoxygenation of the castor oil as raw oil for the hydroisomerization and cracking reaction; regulating a pressure of a reaction system to 4 MPa, a reaction temperature to 280° C. a hydrogen-oil ratio to 1400, and volume space velocity of the fed raw oil to 1 $h^{-1}$; and collecting a liquid product obtained in the reaction every 2 hours. The content of straight-chain and branched-chain alkanes having a carbon number of 8 to 16 in the test product is analyzed by gas chromatography-mass spectrometry (Agilent gas chromatograph and mass spectrometer), and results are shown in Table 2.

The preparation method of the anhydrous liquid product obtained after the hydrodeoxygenation of the castor oil performs preparation according to the method illustrated in the literature (Liu, S.; Zhu, Q.; Guan, Q.; He, L.; Li, W. Bio-aviation fuel production from hydroprocessing castor oil promoted by the nickel-based bifunctional catalysts. Bioresour. Technol. 2015, 183, 93-100.), and particularly includes: obtaining a hydrodeoxygenation product by using castor oil (the castor oil is available from Tianjin Guangfu Science and Technology Co., Ltd., wherein 90% of the component is ricinoleic acid and 10% of the component is palmitic acid and stearic acid) as the raw material and adopting a catalyst (the catalyst includes SAPO-11 as the carrier and includes $Ni_2P$ as the active component, wherein the active component accounts for 25% of the total mass of the catalyst), and removing water from the hydrodeoxygenation product by separating the water using a separating funnel, thereby obtaining the anhydrous liquid product after the hydrodeoxygenation of the castor oil. Through analysis and detection by gas chromatography-mass spectrometry (Agilent gas chromatograph and mass spectrometer), the obtained anhydrous liquid product mainly includes: 95-97% of alkanes having the carbon number of 17 and 18, 1-3% of alkanes having the carbon number of 8-16, and 1-2% of alkanes having the carbon number of 5-7.

Embodiment 12. A Using Method of a Hydrodeoxygenation and Cracking Catalyst Comprises the Following Steps (1) pretreatment of the catalyst: forming 6 g of the catalyst cat1 in embodiment 1 and then filling the catalyst in a fixed bed reactor; heating to 400° C. under nitrogen purging with volume space velocity of 1000 $h^{-1}$; changing into hydrogen with the same volume space velocity; maintaining a temperature of 400° C. or 3 hours, and regulating a temperature of the reactor to 320° C. and (2) hydroisomerization and cracking reaction: adopting an anhydrous liquid product obtained after the hydrodeoxygenation of the castor oil as raw oil for the hydroisomerization and cracking reaction; regulating a pressure of a reaction system to 3 MPa, a reaction temperature to 320° C. a hydrogen-oil ratio to 1000, and volume space velocity of the fed raw oil to 2 $h^{-1}$; and collecting a liquid product obtained in the reaction every 2 hours. The content of straight-chain and branched-chain alkanes having a carbon number of 8 to 16 in the test product is analyzed by gas chromatography-mass spectrometry (Agilent gas chromatograph and mass spectrometer), and results are shown in Table 2.

Embodiment 13. A Using Method of a Hydrodeoxygenation and Cracking Catalyst Comprises the Following Steps (1) pretreatment of the catalyst: forming 6 g of the catalyst cat1 in embodiment 1 and then filling the catalyst in a fixed bed reactor; heating to 400° C. under nitrogen purging with volume space velocity of 1000 $h^{-1}$; changing into hydrogen with the same volume space velocity; maintaining a temperature of 400° C. for 3 hours, and regulating a temperature of the reactor to 340° C. and (2) hydroisomerization and cracking reaction: adopting an anhydrous liquid product obtained after the hydrodeoxygenation of the castor oil as raw oil for the hydroisomerization and cracking reaction; regulating a pressure of a reaction system to 2 MPa, a reaction temperature to 340° C. a hydrogen-oil ratio to 800, and volume space velocity of the fed raw oil to 3 $h^{-1}$; and collecting a liquid product obtained in the reaction every 2 hours. The content of straight-chain and branched-chain alkanes having a carbon number of 8 to 16 in the test product is analyzed by gas chromatography-mass spectrometry (Agilent gas chromatograph and mass spectrometer), and results are shown in Table 2.

Reference Example 1. The Purpose is to Compare Preparation Steps of a TS-1 Catalyst not Modified by Al with the Steps in Embodiment 1

(1) preparation method of TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, and continuously stirring for 3 h after the dropwise adding is completed to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. or 6 h to obtain TS-1, i.e., the carrier B; and (2) uploading active components: under conditions of stirring at roan temperature, dissolving 0.2 g of urea into 24 g of deionized water and stirring until dissolved to obtain a solution E; then adding 7.5 g of nickel nitrate and continuously stirring for 1 h; then adding 0.73 g of ammonium metatungstate and stirring until completely dissolved; then adding 8 g of carrier B into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with 1% of $O_2/N_2$ passivating gases for 3 hours and taking out of the passivating gases, thereby obtaining the hydroisomerization and cracking catalyst for preparing the biological aviation kerosene from the castor oil, denoted by cat11.

Reference Example 2. The Purpose is to Compare Preparation Steps of a TS-1 Catalyst not Modified by Al with the Steps in Embodiment 2

(1) preparation method of TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, and continuously stirring for 3 h after the dropwise adding is completed to obtain a solution C; writing down the mass of the solution C, then heating, stirring and refluxing the solution C in a water bath with a constant temperature at 80° C. for 3 h, removing isopropanol from the solution, and then complementing the mass of the solution to the value before heating, stirring and refluxing by using deionized water to obtain a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h to obtain TS-1, i.e., the carrier B; and (2) uploading active components: under conditions of stirring at room temperature, dissolving 0.2 g of urea into 22.5 g of deionized water and stirring until dissolved to obtain a solution E; then adding 10 g of nickel nitrate and continuously stirring for 1 h; then adding 0.93 g of ammonium molybdate and stirring until completely dissolved; then adding 7.5 g of carrier B into the solution and continuously stirring for 3 h; drying the mixture in a rotary evaporator at 90° (and then calcining the obtained solid powder in an air atmosphere at 600° C. for 3 h; then reducing at 600° C. at a hydrogen flow rate of 250 mL/min for 3 h; cooling to room temperature after the reaction is completed; and then passivating with 1% of $O_2/N_2$ passivating gases for 3 hours and taking out of the passivating gases, thereby obtaining the hydroisomerization and cracking catalyst for preparing the biological aviation kerosene from the castor oil, denoted by cat12.

Reference Example 3. The Purpose is to Compare Preparation Steps of a Catalyst without Using Urea as the Dispersant in the Preparation Process with the Steps in Embodiment 1

(1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, then adding 0.08 g of aluminum isopropoxide into the solution A after the dropwise adding is completed, and continuously stirring for 3 h to obtain a solution C; writing down the mass of the solution C; then heating, stirring and refluxing the solution C in a water bath with a constant temperature at 80° C. for 3 h; removing isopropanol from the solution; and then complementing the mass of the solution to the value before heating, stirring and refluxing by using deionized water, thereby obtaining a solution D; then placing the solution D into a polytetrafluoroethylene-lined high-temperature reaction kettle; sealing and then aging at a temperature of 100° C. for 6 h; heating to 160° C. to conduct crystallization for 18 h taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. for 2 h to obtain Al-modified TS-1, i.e., the carrier A; and (2) uploading active components: under conditions of stirring at room temperature, dissolving 7.5 g of nickel nitrate into 24 g of deionized water and continuously stirring for 1 h; then adding 0.73 g of ammonium metatungstate and stirring until completely dissolved; then adding 8 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed, and then passivating with 1% of $O_2/N_2$ passivating gases for 3 hours and taking out of the passivating gases, thereby obtaining the hydroisomerization and cracking catalyst for preparing the biological aviation kerosene from the castor oil, denoted by cat13.

Reference Example 4. The Purpose is to Compare Preparation Steps of a Catalyst without Using Urea as the Dispersant in the Preparation Process with the Steps in Embodiment 2

(1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, then adding 0.08 g of aluminium isopropoxide into the solution A after the dropwise adding is completed, and continuously stirring for 3 h to obtain a solution C; writing down the mass of the solution C; then heating, stirring and refluxing the solution C in a water bath with a constant temperature at 80° C. for 3 h; removing isopropanol from the solution; and then complementing the mass of the solution to the value before heating, stirring and refluxing by using deionized water, thereby obtaining a solution D; then placing the solution D into a polytetrafluoroethylene-lined high-temperature reaction kettle; sealing and then aging at a temperature of 100° C. for 6 h, heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 3 h; separating the sample through suction filtration and then washing the sample with deionized water until neutral; and drying and then calcining in a nitrogen atmosphere at 550° C. or 2 h to obtain Al-modified TS-1, i.e., the carrier A; and (2) uploading active components: under conditions of stirring at room temperature, dissolving 10 g of nickel nitrate into 22.5 g of deionized water and continuously stirring for 1 h; then adding 0.93 g of ammonium molybdate and stirring until completely dissolved; then adding 7.5 g of carrier A into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; coding to room temperature after the reaction is completed, and then passivating with 1% of O$_2$/N$_2$ passivating gases for 3 hours and taking out of the passivating gases, thereby obtaining the hydroisomerization and cracking catalyst for preparing the biological aviation kerosene from the castor oil, denoted by cat14.

Reference Example 5. The Purpose is to Compare Preparation Steps of an Al-Modified TS-1 Catalyst which Realizes Different Removal Amounts of Aluminum by Controlling the Time of Heating, Stirring and Refluxing with the Steps in Embodiment 1

(1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, then adding 0.08 g of aluminum isopropoxide into the solution A after the dropwise adding is completed, and continuously stirring for 3 h to obtain a solution C; writing down the mass of the solution C; then heating, stirring and refluxing the solution C in a water bath with a constant temperature at 80° C. for 3 h; removing isopropanol from the solution; and then complementing the mass of the solution to the value before heating, stirring and refluxing by using deionized water, thereby obtaining a solution D; then placing the solution D into a polytetrafluoroethylene-lined high-temperature reaction kettle; sealing and then aging at a temperature of 100° C. for 6 h; heating to 16° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 1 h; separating the sample through suction filtration and then washing the sample with deionized water until neutral; and drying and then calcining in a nitrogen atmosphere at 550° C. for 2 h to obtain Al-modified TS-1, i.e., the carrier C; and (2) uploading active components: under conditions of stirring at room temperature, dissolving 0.2 g of urea into 24 g of deionized water, and stirring and dissolving to obtain a solution F; then adding 7.5 g of nickel nitrate and continuously stirring for 1 h; then adding 0.73 g of ammonium metatungstate and stirring until completely dissolved; then adding 8 g of carrier C into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed, and then passivating with O$_2$/N$_2$ passivating gases at a volume ratio of 1% for 3 hours and taking out of the passivating gases, thereby obtaining the hydroisomerization and cracking catalyst for preparing the biological aviation kerosene from the castor oil, denoted by cat15.

Reference Example 6. The Purpose is to Compare Preparation Steps of an Al-Modified TS-1 Catalyst which Realizes Different Removal Amounts of Aluminum by Controlling the Time of Heating, Stirring and Refluxing with the Steps in Embodiment 1

(1) preparation method of Al-modified TS-1: dropwise adding 5.69 g of aqueous solution of 25% TPAOH (tetrapropylammonium hydroxide) into 20 g of deionized water under stirring at 50° C. and after stirring for 30 minutes, slowly adding 5.83 g of tetraethoxysilane and continuously stirring for 2 h to obtain a solution A; dropwise adding 0.14 g of tetrabutyl titanate into 0.3 g of isopropanol under stirring at 50° C. and then continuously stirring for 0.5 h to obtain a solution B; then slowly adding the solution B dropwise into the solution A under high-speed stirring, then adding 0.08 g of aluminum isopropoxide into the solution A after the dropwise adding is completed, and continuously stirring for 3 h to obtain a solution C; writing down the mass of the solution C; then heating, stirring and refluxing the solution C in a water bath with a constant temperature at 80° C. for 3 h; removing isopropanol from the solution; and then complementing the mass of the solution to the value before heating, stirring and refluxing by using deionized water, thereby obtaining a solution D; then placing the solution D into a polytetrafluoroethylene-lined high-temperature reaction kettle; sealing and then aging at a temperature of 100° C. for 6 h; heating to 160° C. to conduct crystallization for 18 h; taking out and washing the sample with deionized water until neutral after the crystallization is completed; drying and then calcining the sample in a muffle furnace at 550° C. for 6 h; cooling the sample to room temperature and then placing into an HCl solution of 0.5 mol/L; heating, stirring and refluxing at 60° C. for 5 h; separating the sample through suction filtration and then washing the sample with deionized water until neutral; and drying and then calcining in a nitrogen atmosphere at 550° C. for 2 h to obtain Al-modified TS-1, i.e., the carrier D; and (2) uploading active components: under conditions of stirring at room temperature, dissolving 0.2 g of urea into 24 g of deionized water, and stirring and dissolving to obtain a solution E; then adding 7.5 g of nickel nitrate and continuously stirring for 1 h; then adding 0.73 g of ammonium metatungstate and stirring until completely dissolved; then adding 8 g of carrier D into the solution and continuously stirring for 3 h; drying the mixture in a rotary evaporator at 90° C. and then calcining the obtained solid powder in an air atmosphere at 600° C. for 3 h; then reducing at 600° C. at a hydrogen flow rate of 250 mL/min for 3 h; cooling to room temperature after the reaction is completed, and then passivating with $O_2/N_2$ passivating gases at a volume ratio of 1% for 3 hours and taking out of the passivating gases, thereby obtaining the hydroisomerization and cracking catalyst for preparing the biological aviation kerosene from the castor oil, denoted by catl6.

Evaluation results of the catalysts catl-2 and catl1-14 when operated according to the using method of embodiment 12 are shown in Table 1:

TABLE 1

| Catalyst | Conversion rate of castor oil (%) | Liquid yield (%) | C8-C16 selectivity (%) |
|---|---|---|---|
| cat 1 | 98.7 | 95.5 | 83.4 |
| cat 2 | 97.5 | 94.3 | 85.8 |
| cat 11 | 81.4 | 80.4 | 52.0 |
| cat 12 | 82.2 | 81.8 | 53.5 |
| cat 13 | 81.5 | 81.2 | 68.2 |
| cat 14 | 82.2 | 82.0 | 67.6 |

The evaluation results of the catalyst catl when operated according to using methods of embodiments 11, 12 and 13 are shown in Table 2:

TABLE 2

| Embodiment | C5-C7 content (%) | C8-C16 content (%) | C17-C18 content (%) |
|---|---|---|---|
| Embodiment 11 | 5.0 | 76.6 | 18.4 |
| Embodiment 12 | 7.2 | 83.4 | 9.4 |
| Embodiment 13 | 18.3 | 75.8 | 5.9 |

The evaluation results of the catalysts catl and catl5-16 when operated according to the using method of embodiment 12 are shown in Table 3:

TABLE 3

| Catalyst | C5-C7 content (%) | C8-C16 content (%) | C17-C18 content (%) |
|---|---|---|---|
| cat 1 | 7.2 | 83.4 | 9.4 |
| cat 15 | 28.5 | 69.1 | 2.4 |
| cat 16 | 4.6 | 64.5 | 30.9 |

The biological aviation kerosene prepared from pure castor oil through the reaction has a freezing point of −50° a flashing point of 46° C. a viscosity of 3.5 mm2S-1, a boiling point between 200-300° C. and the content of sulfur, olefin, and aromatic hydrocarbon of 0. All indicators reach the standard of the aviation kerosene, and are similar to indicators of the biological aviation kerosene prepared from Jatropha curcas.

We claim:
1. A preparation method of a hydroisomerization and cracking catalyst for preparing biological aviation kerosene from castor oil, the catalyst comprising titanium silicate molecular sieve (TS-1) as a carrier, and NixW and NixMo as active components, wherein x is an atomic ratio of Ni to W or Ni to Mo, and x=5-10, Al is removed partially from the carrier, and a mass of the active components accounts for 5-30% of a total mass of the catalyst, the preparation method comprising following steps:
  1) thoroughly stirring and mixing an aqueous solution of tetrapropylammonium hydroxide with a tetraethoxysilane solution at a temperature of 40-55° C. for 0.5-2 h, then adding an isopropanol solution of tetrabutyl titanate to obtain a mixed solution, and then adding aluminium isopropoxide and continuously stirring for 1-3 h;
  2) heating, stirring and refluxing the above mixed solution in a water bath with a constant temperature of 75-85° C. for 1-3 h to remove the isopropanol from the solution, and then complementing the mass of the solution obtained after refluxing to the value before heating, stirring and refluxing by using deionized water;
  3) transferring the above solution into a high pressure reaction kettle to conduct aging at 95-105° C. for 4-6 h, then heating to 150-180° C. to conduct crystallization for 6-36 h to obtain a sample, taking out and washing the sample with deionized water until neutral, calcining in a muffle furnace at 500-550° C. for 4-6 h after drying, cooling to room temperature and then placing into an HCl solution of 0.5 mol/L, and heating, stirring and refluxing at 50-60° C. for 1-5 h;
  4) separating the sample through suction filtration, washing with deionized water until neutral, and after drying, calcining at 500-550° C. for 2-4 h under a nitrogen atmosphere to obtain the carrier;
  5) sequentially adding nickel nitrate, and ammonium metatungstate, or adding nickel nitrate an ammonium molybdate, into an aqueous solution of urea according to a ratio under room-temperature stirring conditions, stirring for 0.5-1 h until completely dissolved, then adding the carrier and stirring for at least 2 h, and drying the mixture in a rotary evaporator at 80-90° C. to obtain solid powder; and
  6) calcining the solid powder in an air atmosphere at 550-600° C. for at least 2 h, then reducing at 550-600° C. at a hydrogen flow rate of 200-300 mL/min for at least 3 h, cooling to room temperature, and then pas- sivating with $O_2/N_2$ passivating gases at a volume ratio of 1% for 3 hours to obtain the desired catalyst.

2. The method according to claim 1, wherein a ratio of materials in steps 1) to 2) is $SiO_2$:$TiO_2$:TPAOH:aluminium isopropoxide:isopropanol:H2O=1:(0.01-0.02):(0.1-0.4):(0.01-0.02):(0.1-0.5):(20-100).

3. The method according to claim 1, wherein an added amount of the urea in step 5) is 2-5% of the mass of the carrier.

4. The method according to claim 1, wherein an added amount of the urea in step 5) is 2-3% of the mass of the carrier.

* * * * *